United States Patent
Haynes et al.

(10) Patent No.: US 10,710,733 B2
(45) Date of Patent: Jul. 14, 2020

(54) EVACUATION SLIDE WITH ASPIRATOR RETENTION STRAP

(71) Applicant: GOODRICH CORPORATION, Charlotte, NC (US)

(72) Inventors: Timothy C. Haynes, Prescott Valley, AZ (US); Drew Hartman, Phoenix, AZ (US)

(73) Assignee: GOODRICH CORPORATION, Charlote, NC (US)

( * ) Notice: Subject to any disclaimer, the term of this patent is extended or adjusted under 35 U.S.C. 154(b) by 342 days.

(21) Appl. No.: 15/786,295

(22) Filed: Oct. 17, 2017

(65) Prior Publication Data

US 2019/0112059 A1    Apr. 18, 2019

(51) Int. Cl.
*B64D 25/14* (2006.01)
*B63C 9/04* (2006.01)

(52) U.S. Cl.
CPC .............. *B64D 25/14* (2013.01); *B63C 9/04* (2013.01); *B63C 2009/042* (2013.01)

(58) Field of Classification Search
CPC .................................. B64D 25/14; B63C 9/04
See application file for complete search history.

(56) References Cited

U.S. PATENT DOCUMENTS

| 3,910,532 | A | * | 10/1975 | Fischer | B64D 25/14 244/137.2 |
|---|---|---|---|---|---|
| 5,102,070 | A | * | 4/1992 | Smialowicz | B64D 25/14 182/48 |
| 6,321,770 | B1 | * | 11/2001 | Hintzman | B64D 25/14 137/494 |
| 6,644,596 | B1 | * | 11/2003 | Jurlina | B64D 25/14 244/137.1 |
| 6,814,183 | B2 | * | 11/2004 | Horvath | B64D 25/14 182/48 |
| 6,877,698 | B2 | * | 4/2005 | Baker | B64D 25/14 182/48 |
| 7,467,764 | B2 | * | 12/2008 | Hintzman | B64D 25/14 244/137.2 |
| 2004/0094671 | A1 | * | 5/2004 | Moro | B64D 25/14 244/137.2 |

* cited by examiner

*Primary Examiner* — Justin M Benedik
(74) *Attorney, Agent, or Firm* — Snell & Wilmer, L.L.P.

(57) ABSTRACT

A slide for an evacuation system may comprise an inflatable slide rail structure. An aspirator may be fluidly coupled to the inflatable slide rail structure. An aspirator retention strap may be coupled between the aspirator and the inflatable slide rail structure. The aspirator retention strap may comprise an elastic material. The aspirator retention strap may be configured to stretch when a predetermined internal pressure threshold of the inflatable slide rail structure is exceeded.

15 Claims, 4 Drawing Sheets

EVACUATION SLIDE WITH ASPIRATOR RETENTION STRAP

FIELD

The present disclosure relates to aircraft evacuation systems and, in particular, to an evacuation slide having an aspirator retention strap.

BACKGROUND

An emergency evacuation system may be used to exit an aircraft absent a jet way or other suitable means of egress for passengers. The evacuation system may include an inflatable slide and an aspirator that inflates the slide. In response to deployment of the evacuation system, the inflatable slide may deploy from, for example, an aircraft fuselage while the aspirator inflates the slide. During a water landing deployment, portions of the slide and the aspirator may be located under water. In other instances, upon deployment, the orientation of the aspirator may cause portions of the slide to be ingested by the aspirator. If water or part of the slide is ingested by the aspirator, the slide may not deploy properly or in a timely manner.

SUMMARY

A slide for an evacuation system is disclosed herein. In accordance with various embodiments, the slide may comprise an inflatable slide rail structure, an aspirator coupled to the inflatable slide rail structure, and an aspirator retention strap coupled between the aspirator and the inflatable slide rail structure. The aspirator retention strap may comprise an elastic material.

In various embodiments, the inflatable slide rail structure may comprise an upper inflatable tube and a lower inflatable tube. The aspirator may be coupled to the lower inflatable tube. The aspirator retention strap may be coupled to the aspirator and the upper inflatable tube. The lower inflatable tube may be configured to be located between the upper inflatable tube and an exit surface upon deployment of the slide.

In various embodiments, the aspirator retention strap may be coupled proximate a head end of the slide. In various embodiments, a girt may be located proximate a head end of the slide, and the aspirator retention strap may be coupled to the girt.

In various embodiments, the aspirator retention strap may comprise a first strap coupled to the aspirator, a second strap coupled to the inflatable slide rail structure, and an elastic member coupled between the first strap and the second strap. The elastic member may comprise the elastic material.

A slide for an evacuation system may comprise an upper inflatable tube and a lower inflatable tube. A first aspirator may be coupled to the lower inflatable tube. An aspirator retention strap may be coupled to the upper inflatable tube and the first aspirator. The aspirator retention strap may comprise an elastic material.

In various embodiments, the aspirator retention strap may be configured to orient an inlet of the first aspirator away from an exit surface. The aspirator retention strap may be configured to undergo an elastic deformation. The aspirator retention strap may be configured to stretch when a predetermined internal pressure of the lower inflatable tube is exceeded. In various embodiments, when an internal pressure of the lower inflatable tube is greater than the predetermined internal pressure, the inlet of the first aspirator may be located above the exit surface.

In various embodiments, a second aspirator may be fluidly coupled to the upper inflatable tube. In various embodiments, the aspirator retention strap may comprise a first strap coupled to the first aspirator, a second strap coupled to the upper inflatable tube, and an elastic member coupled between the first strap and the second strap.

An evacuation system is disclosed herein. The evacuation system may comprise an inflatable slide, an aspirator coupled to the inflatable slide, and an aspirator retention strap coupled to the aspirator. The aspirator retention strap may comprise an elastic material.

In various embodiments, the inflatable slide may comprise an upper inflatable tube and a lower inflatable tube. The aspirator may be coupled to the lower inflatable tube. The aspirator retention strap may be coupled to the aspirator and the upper inflatable tube.

In various embodiments, the aspirator retention strap may comprise a first strap coupled to the aspirator, a second strap coupled to the inflatable slide, and an elastic member coupled between the first strap and the second strap. The elastic member may comprise the elastic material. The aspirator retention strap may be configured to stretch when a predetermined internal pressure threshold of the inflatable slide is exceeded. The aspirator retention strap may be configured to orient the aspirator in a first direction when an internal pressure of the inflatable slide is below the predetermined internal pressure threshold. The first direction may be at least one of away from an exit surface or away from the inflatable slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity.

As used herein, "distal" refers to the direction outward, or generally, away from a reference component. As used herein, "proximate" refers to a direction inward, or generally, towards the reference component.

Evacuation systems of the present disclosure may include inflatable slides having aspirator retention straps coupled thereto. The aspirator retention straps may be configured to orient an aspirator, attached to the slide, in a particular direction. For example, upon an initial deployment of the slide, the aspirator retention strap may orient the aspirator in a direction selected to prevent or decrease a likelihood the aspirator with ingest an undesirable material (e.g., water or a portion of the slide).

Figure 1:
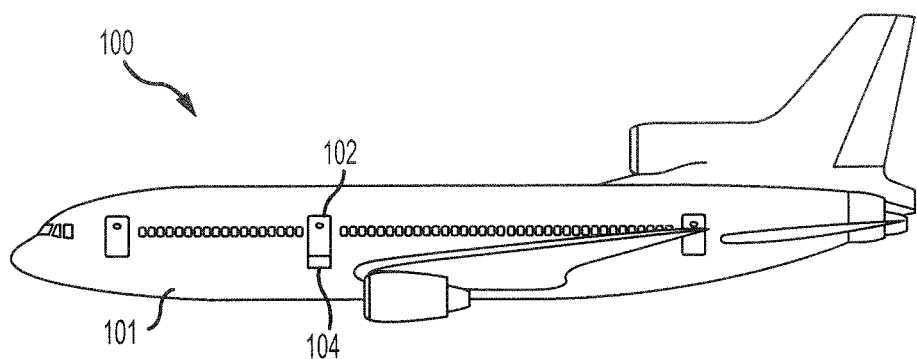
FIG. 1 illustrates an aircraft having an exit door and evacuation system, in accordance with various embodiments.

Referring now to FIG. 1, an aircraft 100 is shown. The aircraft 100 may include a fuselage 101 having plurality of exit doors, including an exit door 102. The aircraft 100 may include one or more evacuation systems positioned near a corresponding exit door. For example, the aircraft 100 includes an evacuation system 104 positioned near exit door 102. In the event of an emergency, exit door 102 may be opened by a passenger or crew member of aircraft 100. In various embodiments, evacuation system 104 may deploy in response to exit door 102 being opened or in response to another action taken by a passenger or crew member such as depression of a button or actuation of a lever.

Figure 2:
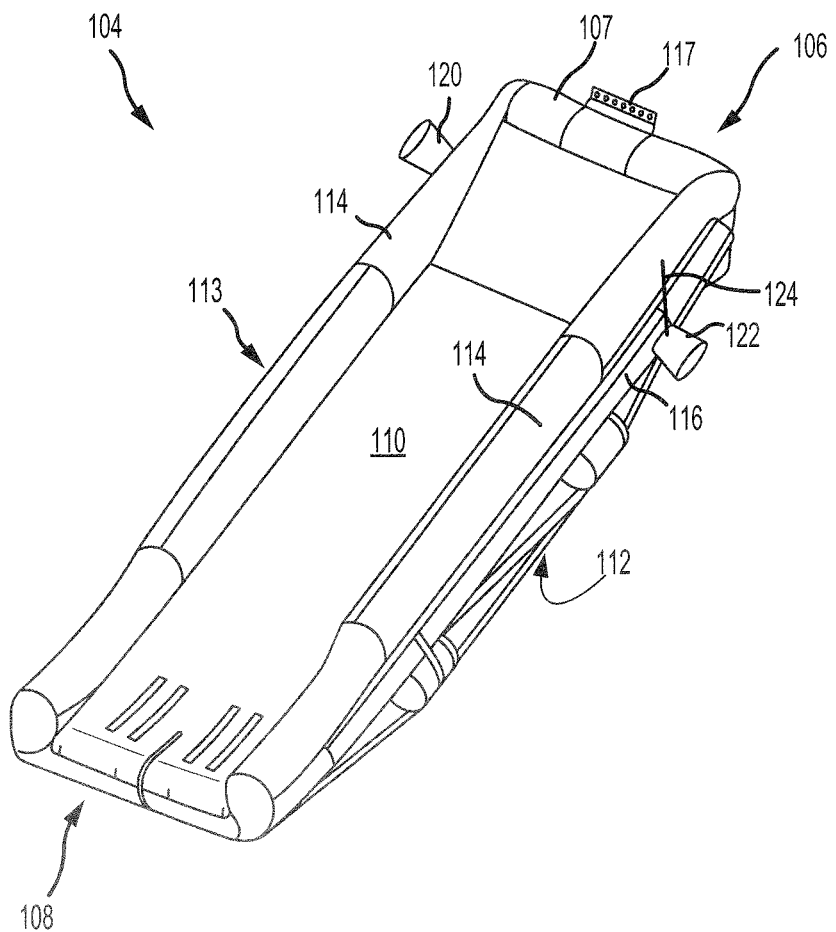
FIG. 2 illustrates a perspective view of an evacuation slide in a deployed position, in accordance with various embodiments.

With reference to FIG. 1 and FIG. 2, evacuation system 104 may comprise an evacuation slide 106. Evacuation slide 106 may comprise a head end 107 and a toe end 108 opposite head end 107. Head end 107 may be coupled to an aircraft structure (e.g., fuselage 101). In various embodiments, evacuation slide 106 comprises an inflatable slide. FIG. 2 illustrates evacuation slide 106 in a fully inflated position.

Evacuation slide 106 may comprise a sliding surface 110 and an underside surface 112 opposite sliding surface 110. Sliding surface 110 may extend from head end 107 to toe end 108. Underside surface 112 may be oriented toward an exit surface (e.g., toward the ground or toward a body of water). Evacuation slide 106 may comprise a single lane slide. However, evacuation slide 106 may comprise any number of lanes. Toe end 108 and/or underside surface 112 may contact an exit surface (e.g. the ground or a body of water) in response to evacuation slide 106 being deployed. In various embodiments, evacuation slide 106 may be coupled to the fuselage 101 via a girt 117. In various embodiments, evacuation slide 106 may be decoupled from the fuselage 101 in response to being fully inflated or to being manually detached in order to allow passengers and/or crew members to safely float away from the aircraft 100.

Evacuation slide may comprise a slide rail structure 113. Slide rail structure may be may be an inflatable slide rail structure. Slide rail structure 113 may comprise a first inflatable tube 114 (also referred to herein as an upper inflatable tube) and a second inflatable tube 116 (also referred to herein as a lower inflatable tube). Upper inflatable tube 114 and lower inflatable tube 116 may extend between head end 107 and toe end 108. Upon deployment of evacuation slide 106, upper inflatable tube 114 may be located generally over or above lower inflatable tube 116 such that upper inflatable tube 114 is distal to the exit surface as compared to lower inflatable tube 116. Stated differently, upon deployment, lower inflatable tube 116 may be located between upper inflatable tube 114 and the exit surface.

Evacuation system 104 may include one or more aspirator(s) configured to inflate slide rail structure 113. In various embodiments, an aspirator 120 may be in fluid communication with upper inflatable tube 114, and an aspirator 122 may be in fluid communication with lower inflatable tube 116. In various embodiments, upper inflatable tube 114 and lower inflatable tube 116 may be in fluid communication with one another. In various embodiments, upper inflatable tube 114 may be discrete from lower inflatable tube 116 (i.e., upper inflatable tube and lower inflatable tube 116 may not be fluid communication with one another), with aspirator 120 may inflating upper inflatable tube 114 and aspirator 122 inflating lower inflatable tube 116.

Figure 3A:
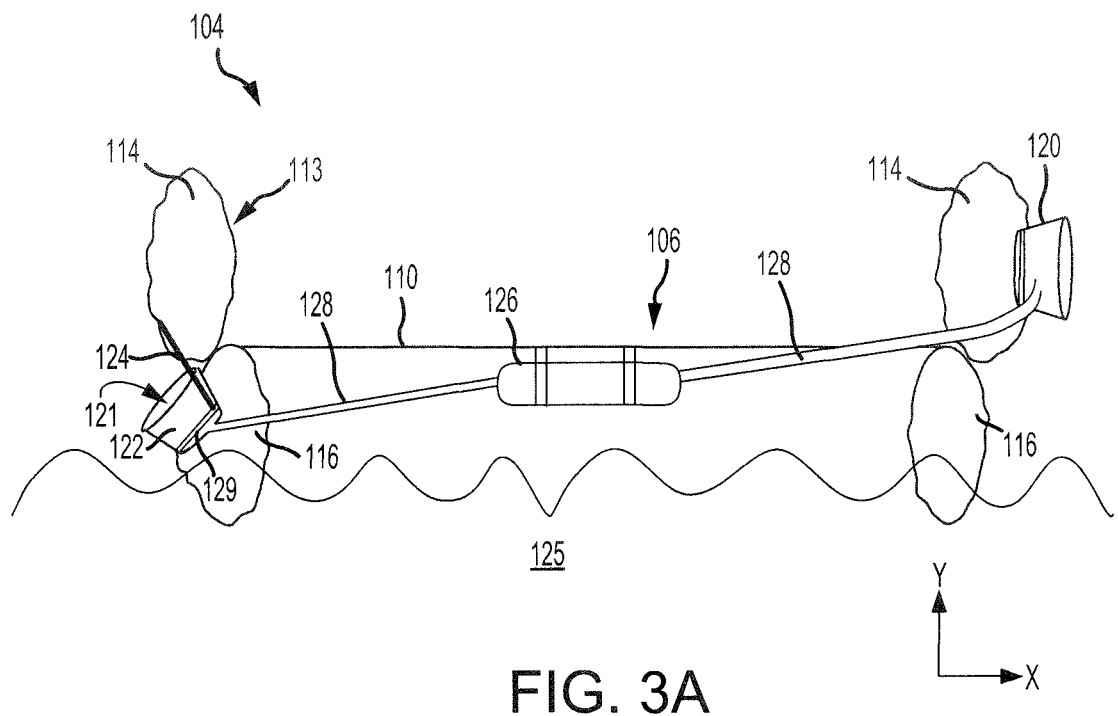
FIG. 3A illustrates inflation of an evacuation slide having an aspirator retention strap orienting the aspirator away from an exit surface, in accordance with various embodiments.
Figure 3B:
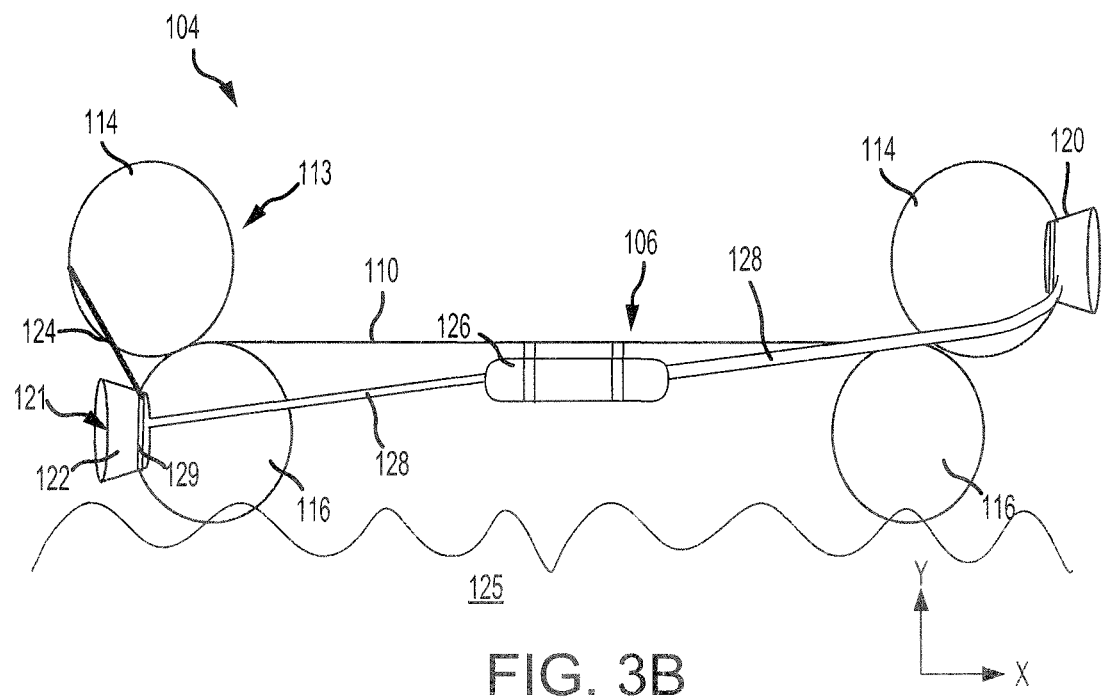
FIG. 3B illustrates an inflated evacuation slide having an aspirator retention strap, in accordance with various embodiments.

With reference to FIG. 3A and FIG. 3B, evacuation system 104 is illustrated with evacuation slide 106 deployed over a body of water 125, in accordance with various embodiments. FIG. 3A illustrates a schematic cross-section of slide rail structure 113 in a partially inflated state, immediately after deployment of evacuation system 104. Evacuation system 104 may include one or more compressed fluid source(s) 126. Compressed fluid source(s) 126 may be fluidly coupled to aspirators 120 and 122 via conduits 128. In various embodiments, each aspirator 120, 122 may have a dedicated compressed fluid source 126 such that a first compressed fluid source is coupled to aspirator 120 and a second compressed fluid source is coupled to aspirator 122. Under normal operating conditions, evacuation slide 106 may be deflated and stored within a compartment of the aircraft 100 (FIG. 1). In various embodiments, evacuation slide 106 and aspirators 120 and 122 may be stored in a single package within the aircraft compartment. In response to deployment of the evacuation system 104, fluid may flow into aspirators 120 and 122 via conduits 128 at a relatively high velocity. This fluid flow may cause aspirators 120 and 122 to draw in gas (i.e., ambient air) from the environment. The fluid flow (such as in a gaseous state) and the environmental gas may be directed into slide rail structure 113. In response to receiving the fluid flow and the environmental gas, slide rail structure 113 may begin to inflate.

Upon initial deployment of evacuation slide 106, portions of lower inflatable tube 116 may be located under water 125. An aspirator retention strap 124 may be coupled to aspirator 122 and may aid in orienting an inlet 121 of aspirator 122 away from water 125. Stated differently, aspirator retention strap 124 may aid in locating inlet 121 above (i.e., out of) water 125. In various embodiments, aspirator retention strap 124 may be coupled between aspirator 122 and upper inflatable tube 114. In various embodiments, aspirator retention strap 124 may be coupled between aspirator 122 and a girt 117, with momentary reference to FIG. 2. For example, aspirator retention strap 124 may be sewn, tied, glued, or otherwise bonded to upper inflatable tube 114 or to girt 117. In various embodiments, aspirator 122 may be coupled to lower inflatable tube 116 via a band clamp 129, and aspirator retention strap 124 may be coupled to the band clamp 129.

In various embodiments, aspirator retention strap 124 may be configured to stretch (i.e., lengthen) in response to an increase in the internal pressure of inflatable tubes 114 and 116. FIG. 3B illustrates a schematic cross-section of slide rail structure 113 in a fully inflated state. Stated differently, FIG. 3B illustrates a schematic cross-section of evacuation slide 106, after a deformation (i.e., stretching) of aspirator retention strap 124. With combined reference to FIGS. 3A and 3B, as aspirators 120 and 122 supply fluid to inflatable tubes 114 and 116, inflatable tubes 114 and 116 inflate and an internal pressure of inflatable tubes 114 and 116 increases. Aspirator retention strap 124 may maintain inlet 121 of aspirator 122 in an orientation generally away from water 125 until the internal pressure of lower inflatable tube 116 has increased above a predetermined threshold pressure. In various embodiments, the predetermined threshold pressure may be an internal pressure of lower inflatable tube 116 that tends to locate aspirator inlet 121 above water 125. Stated differently, immediately after deployment, the inflation and internal pressure of upper inflatable tube 114, in combination with aspirator retention strap 124, may orient inlet 121 of aspirator 122 away water 125. Orienting inlet 121 away from water 125 allows aspirator 122 to aspirate the ambient air into lower inflatable tube 116, thereby increasing the internal pressure of lower inflatable tube 116. As the internal pressure within lower inflatable tube 116 increases, lower inflatable tube 116 inflates and a greater portion of lower inflatable tube 116 is located above (i.e., out of) water 125.

As inflatable tubes 114 and 116 continue to inflate, the internal pressure of inflatable tubes 114 and 116 may overcome the tensile strength of aspirator retention strap 124 and aspirator retention strap 124 may stretch causing an orientation of inlet 121, with respect to water 125, to change. As aspirator retention strap 124 lengthens, aspirator 122 tends to orient toward a more horizontal position. As used herein, a "horizontal position" refers to a position that is substantially parallel to the plane of sliding surface 110 (i.e., substantially parallel to the x-axis). As used herein "substantially parallel" means±10° from parallel.

Aspirator retention strap 124 may be configured such that in response to the internal pressure of lower inflatable tube 116 increasing above the internal pressure associated with inlet 121 being located above water 125, aspirator 122 orients toward the horizontal position. Aspirator retention strap 124 maintaining inlet 121 in an orientation away from water 125 until lower inflatable tube 116 has inflated above the internal pressure associated with inlet 121 being located above water 125 tends to decrease a likelihood that water will be ingestion by aspirator 122.

In various embodiments, aspirator retention strap 124 may be configured to undergo an elastic (e.g., reversible) deformation. Stated differently, aspirator retention strap 124 may increase in length as the internal pressure within the inflatable tubes 114 and 116 increases beyond a predetermined threshold pressure, and may decrease in length as the internal pressure within the inflatable tubes 114 and 116 decreases below the predetermined threshold pressure. Aspirator retention strap 124 may comprise an elastic material, such as elastane, nylon, polyester, natural or synthetic rubber, silicone, elastomer, or any other suitably elastic material. In various embodiments, aspirator retention strap 124 may comprise a unibody member comprised of elastic material. In various embodiments, aspirator retention strap 124 may comprise two opposing straps with an elastic member coupled there between, as discussed in further detail below with reference to FIGS. 5A and 5B.

Figure 4A:
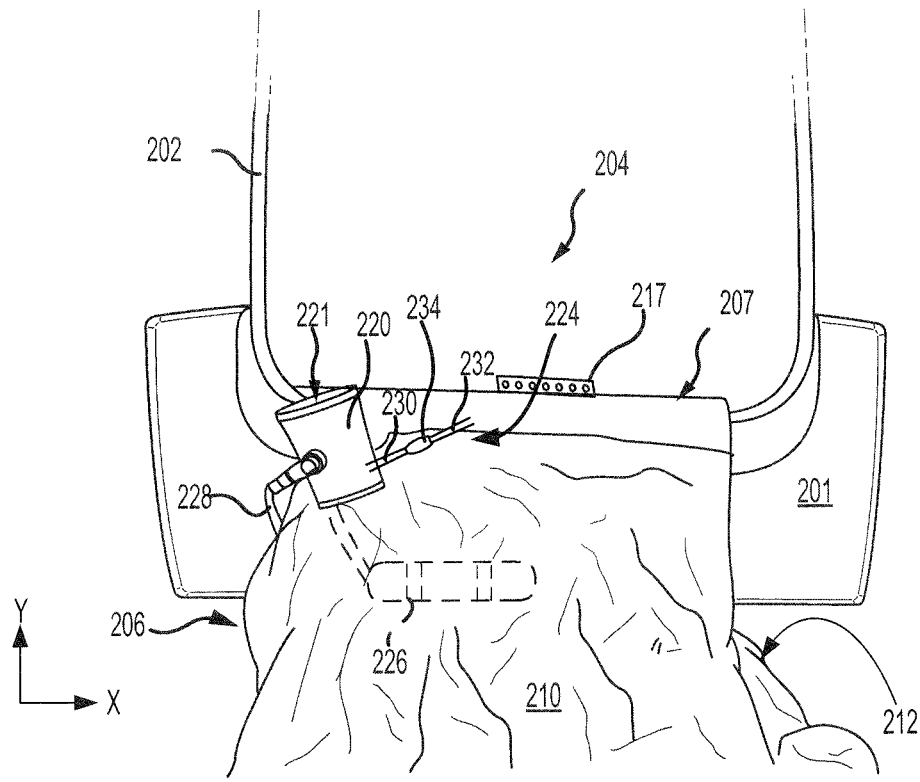
FIG. 4A illustrates a deployment of an evacuation slide with an aspirator retention strap, in accordance with various embodiments.
Figure 4B:
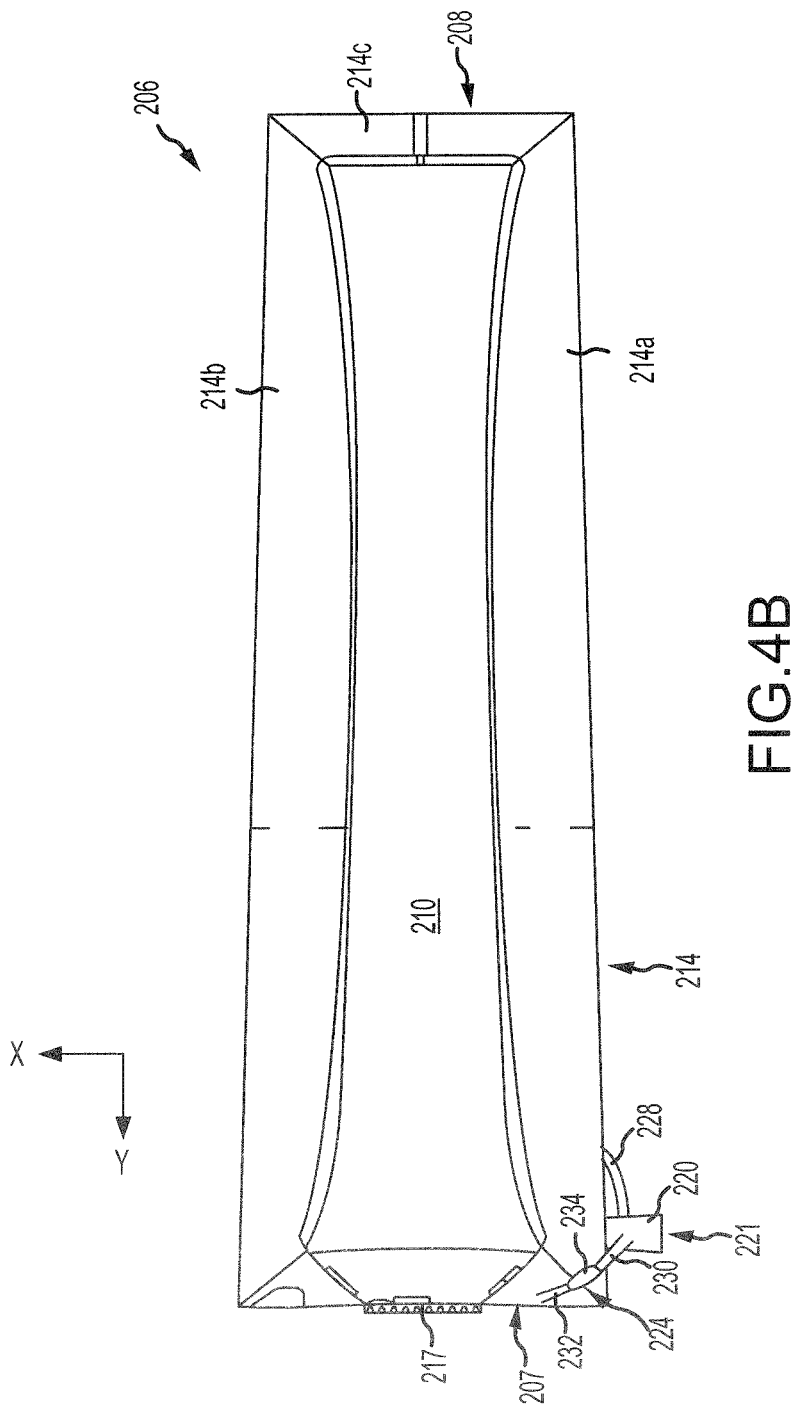
FIG. 4B illustrates an inflated evacuation slide having an aspirator retention strap, in accordance with various embodiments.

Referring to FIG. 4A and FIG. 4B, an evacuation system 204 for an aircraft is illustrated, in accordance with various embodiments. Evacuation system may comprise an evacuation slide 206. Evacuation slide 206 may comprise a head end 207 and a toe end 208 opposite head end 107. Head end 207 may be coupled to an aircraft structure (e.g., a fuselage 201. FIG. 4A illustrates evacuation slide 206 in a partially inflated stated, immediately after deployment of evacuation system 204 (i.e., after evacuation slide 206 is dropped from a door sill 202 fuselage 201). FIG. 4B illustrates evacuation slide 206 in a fully inflated position. Evacuation slide 206 may comprise a sliding surface 210 and an underside surface 212 opposite sliding surface 210. Evacuation slide 206 may comprise a single lane slide. However, evacuation slide 206 may comprise any number of lanes. Toe end 208 may contact an exit surface (e.g. the ground or a body of water) in response to evacuation slide 206 being deployed.

Evacuation slide 206 may comprise a slide rail structure 214 in bordering engagement with sliding surface 210. Slide rail structure 214 may comprise an inflatable slide rail structure. Slide rail structure 214 may comprise at least a first inflatable tube 214a and a second inflatable tube 214b, which border opposite sides of sliding surface 210. According to various embodiments, slide rail structure 214 further comprises a ground tube 214c located at toe end 208 of sliding surface 210. In various embodiments, first inflatable tube 214a, second inflatable tube 214b, and ground tube 214c form a continuous inflatable unit.

Evacuation system 204 may include one or more aspirator(s) 220 configured to inflate slide rail structure 214. In various embodiments, an aspirator 120 may be in fluid communication with slide rail structure 214. For example, aspirator may be fluidly coupled to first inflatable tube 214a, Evacuation system may include a compressed fluid source 126. Compressed fluid source 126 may be fluidly coupled to aspirator 120 via conduit 228. In response to deployment of the evacuation system 204, fluid may flow into aspirator 220 and may cause aspirator 120 to draw in gas (i.e., ambient air) from the environment. The fluid flow (such as in a gaseous state) and the environmental gas may be directed into slide rail structure 214. In response to receiving the fluid flow and the environmental gas, slide rail structure 214 may begin to inflate.

An aspirator retention strap 224 may be coupled to aspirator 220. Upon an initial deployment of evacuation slide 206 aspirator retention strap 224 may aid in orienting an inlet 221 of aspirator 220 away from evacuation slide 206. For example, aspirator retention strap 224 may be configured to orient inlet 221 away from first inflatable tube 214a, sliding surface 210, or any other portion of evacuation slide 206 that may be susceptible to being ingested by aspirator 220. In various embodiments, aspirator retention strap 224 may be coupled between aspirator 220 and head end 207 evacuation slide 206. In various embodiments, aspirator retention strap 224 may be coupled between aspirator 220 and a girt 217 located proximate head end 207. Aspirator retention strap 224 may be sewn, tied, glued, or otherwise bonded to head end 207 or to a girt 217. In various embodiments, aspirator 220 may be coupled to first inflatable tube 214a via a band clamp, and aspirator retention strap 224 may be coupled to the band clamp.

Figure 5A:
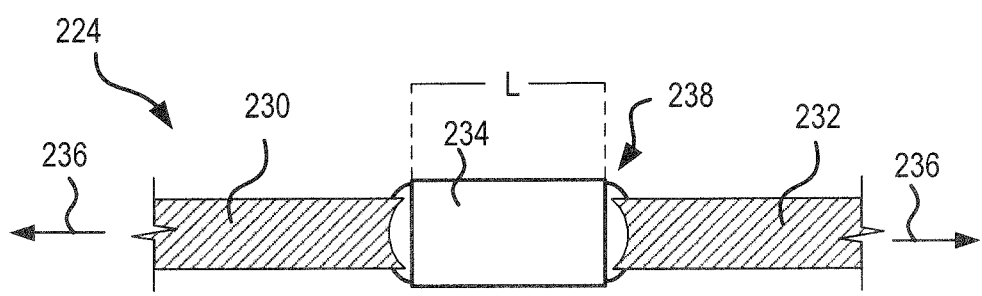
FIGS. 5A and 5B illustrate an aspirator retention strap having an elastic member, in accordance with various embodiments.
Figure 5B:
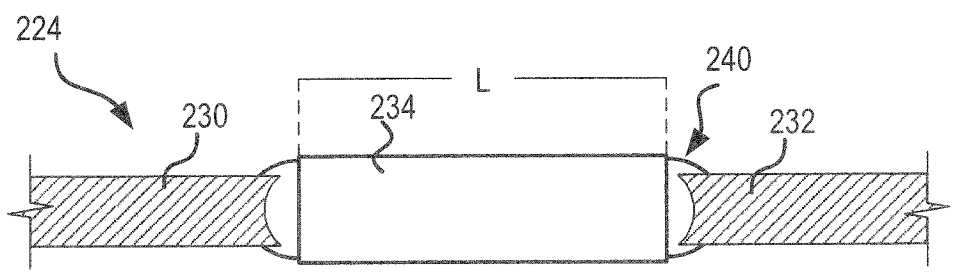

With reference to FIG. 4A, FIG. 5A, and FIG. 5B, in various embodiments, aspirator retention strap 224 may comprise a first strap 230 coupled to aspirator 220, a second strap 232 coupled to evacuation slide 206, and an elastic member 234 coupled between first strap 230 and second strap 232. First strap 230 and second strap 232 may comprise a rope, tape, ribbon, webbing, or other suitable strap. Elastic member 234 may comprise a stretchable material configured deform in response to a tensile load 236 being applied to first strap 230 and second strap 232. Tensile load 236 may be generated in response to an increasing internal pressure of slide rail structure 214. For example, as aspirator 220 supplies fluid to slide rail structure 214, slide rail structure 214 inflates and an internal pressure of slide rail structure 214 increases, thereby generating tensile load 236.

Elastic member 234 be configured to undergo an elastic (e.g., reversible) deformation. Stated differently, a length L of elastic member 234 may increase as the internal pressure within slide rail structure 214 increases beyond a predetermined threshold pressure, and length L may decrease when the internal pressure within the slide rail structure 214 decreases below the predetermined threshold pressure.

Returning to FIGS. 4A and 4B, aspirator retention strap 224 may maintain inlet 221 in an orientation generally away from evacuation slide 206, until the internal pressure of slide rail structure 214 has increased above the predetermined threshold pressure. For example, immediately after deployment, aspirator retention strap 224 may orient inlet 221 of aspirator 220 towards sill 202 and generally away from evacuation slide 206. As slide rail structure 214 inflates, the internal pressure of slide rail structure 214 may overcome the tensile strength of aspirator retention strap 224 and aspirator retention strap 224 may stretch allowing an orientation of inlet 221 to change. For example, as aspirator retention strap 224 lengthens, aspirator 220 tends to orient toward a more horizontal position. As used herein, a "horizontal position" refers to a position that is substantially perpendicular to first inflatable tube 114a (i.e., substantially perpendicular to the y-axis). As used herein "substantially perpendicular" means±100 from perpendicular.

Aspirator retention strap 224 may be configured such that in response to the internal pressure of the slide rail structure 214 increasing above the predetermined internal pressure, aspirator 220 begins to orient toward the horizontal position. The predetermined internal pressure may be an internal pressure associated with slide rail structure 214 being able to maintain an orientation of inlet 221 away from evacuation slide 206. For example, upon initial deployment, the decreased stiffness (i.e., relatively low internal pressure) of slide rail structure 214 may be unable to counter the weight of aspirator 220, such that slide rail structure 214 may be manipulated by aspirator 220 and inlet 221 may orient toward evacuation slide 206. As the internal pressure and stiffness of slide rail structure 214 increases, the position of aspirator 220 and orientation of inlet 221 becomes more fixed. Stated differently, when the internal pressure of slide rail structure 214 increases above the predetermined threshold, the weight of aspirator 220 tends not to generate enough force to overcome the internal pressure of slide rail structure 214 (i.e., a stiffness of slide rail structure 214 does not allow inlet 221 to orient toward evacuation slide 206). Aspirator retention strap 224 may maintain inlet 221 in an orientation away from evacuation slide 206, until slide rail structure 214 has inflated above the internal pressure (i.e., stiffness) associated with slide rail structure 214 maintaining the orientation of inlet 221 away from evacuation slide 206. Aspirator retention strap 224 maintaining inlet 221 in an orientation away from evacuation slide 206, until slide rail structure 214 can maintain the orientation inlet 221, tends to decrease a likelihood that aspirator 220 will ingest evacuation slide 206.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A slide for an evacuation system, comprising:
an inflatable slide rail structure comprising an upper inflatable tube and a lower inflatable tube;
an aspirator coupled to the lower inflatable tube of the inflatable slide rail structure; and
an aspirator retention strap coupled between the aspirator and the upper inflatable tube of the inflatable slide rail structure, the aspirator retention strap comprising an elastic material.

2. The slide of claim 1, wherein the lower inflatable tube is configured to be located between the upper inflatable tube and an exit surface upon deployment of the slide.

3. The slide of claim 1, wherein the aspirator retention strap is coupled proximate a head end of the slide.

4. The slide of claim 1, wherein the aspirator retention strap comprises:
a first strap coupled to the aspirator;
a second strap coupled to the inflatable slide rail structure; and
an elastic member coupled between the first strap and the second strap, the elastic member comprising the elastic material.

5. A slide for an evacuation system, comprising:
an upper inflatable tube;
a lower inflatable tube;
a first aspirator coupled to the lower inflatable tube; and
an aspirator retention strap coupled to the upper inflatable tube and the first aspirator, the aspirator retention strap comprising an elastic material.

6. The slide of claim 5, wherein the aspirator retention strap is configured to orient an inlet of the first aspirator away from an exit surface.

7. The slide of claim 6, wherein the aspirator retention strap is configured to undergo an elastic deformation.

8. The slide of claim 7, wherein the aspirator retention strap is configured to stretch when a predetermined internal pressure of the lower inflatable tube is exceeded.

9. The slide of claim 8, wherein when an internal pressure of the lower inflatable tube is greater than the predetermined internal pressure, the inlet of the first aspirator is located above the exit surface.

10. The slide of claim 5, further including a second aspirator fluidly coupled to the upper inflatable tube.

11. The slide of claim 5, wherein the aspirator retention strap comprises:
a first strap coupled to the first aspirator;
a second strap coupled to the upper inflatable tube; and
an elastic member coupled between the first strap and the second strap.

12. An evacuation system, comprising:
an inflatable slide;
an aspirator coupled to the inflatable slide; and
an aspirator retention strap coupled to the aspirator, the aspirator retention strap comprising an elastic material, wherein the aspirator retention strap is configured to stretch in response to an internal pressure of the inflatable slide exceeding a predetermined internal pressure threshold, and wherein the aspirator retention strap is configured to orient the aspirator in a first direction when the internal pressure of the inflatable slide is less than the predetermined internal pressure threshold, the first direction being at least one of away from an exit surface or away from the inflatable slide.

13. The evacuation system of claim 12, wherein the inflatable slide comprises an upper inflatable tube and a lower inflatable tube, and wherein the aspirator is coupled to the lower inflatable tube.

14. The evacuation system of claim 13, wherein the aspirator retention strap is coupled to the aspirator and the upper inflatable tube.

15. The evacuation system of claim 12, wherein the aspirator retention strap comprises:
a first strap coupled to the aspirator;
a second strap coupled to the inflatable slide; and
an elastic member coupled between the first strap and the second strap, the elastic member comprising the elastic material.

* * * * *